March 16, 1954 J. O. EVERHART ET AL 2,671,939
METHOD AND APPARATUS FOR FORMING TUBULAR CERAMIC BODIES
Filed April 28, 1950 2 Sheets-Sheet 1
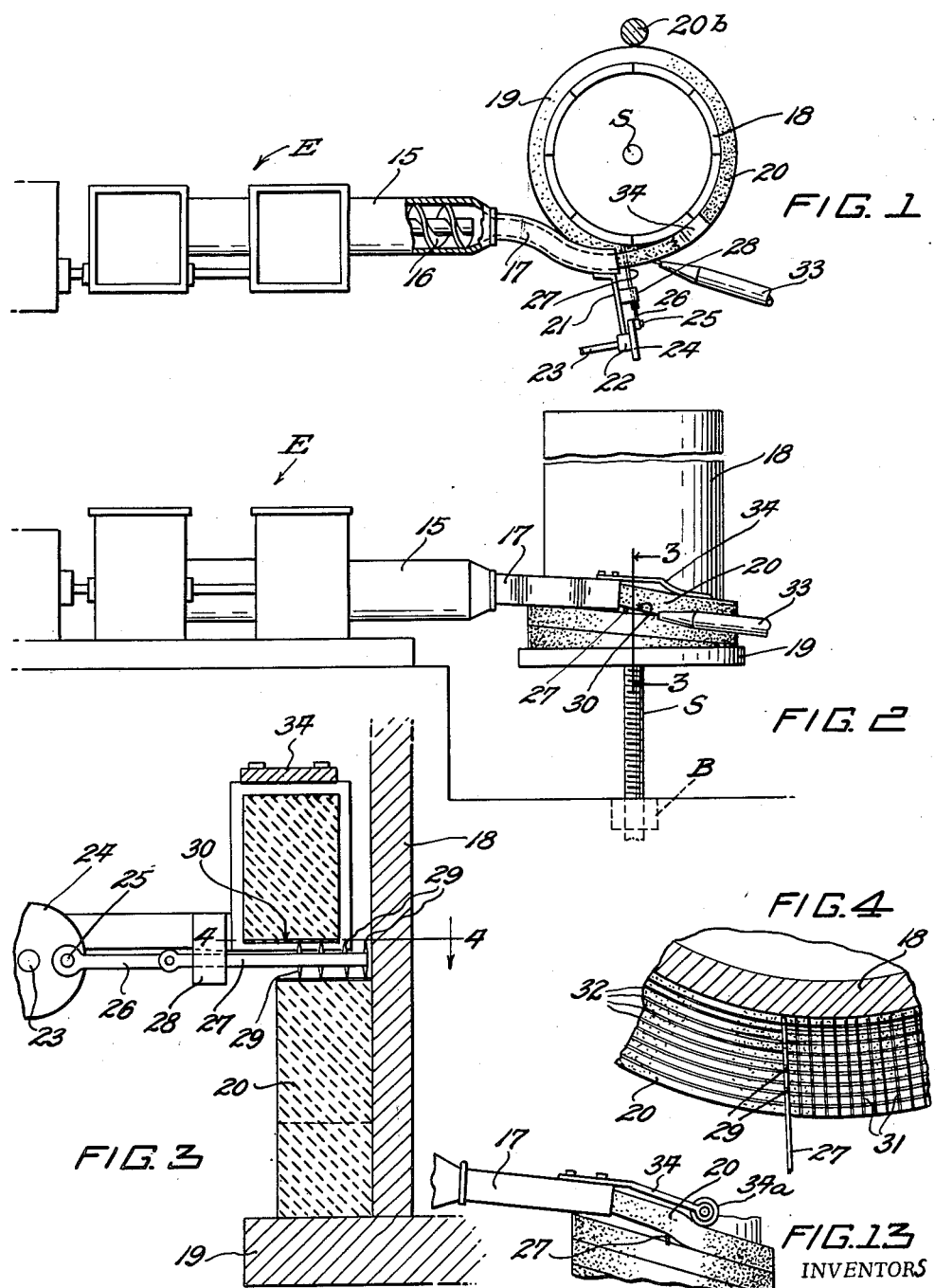
INVENTORS
John O. Everhart
BY Karl E. Krill
Robert E. Dine
Roland R. Van Den Beek
W. A. McDowell ATTORNEY March 16, 1954  J. O. EVERHART ET AL  2,671,939
METHOD AND APPARATUS FOR FORMING TUBULAR CERAMIC BODIES
Filed April 28, 1950  2 Sheets-Sheet 2
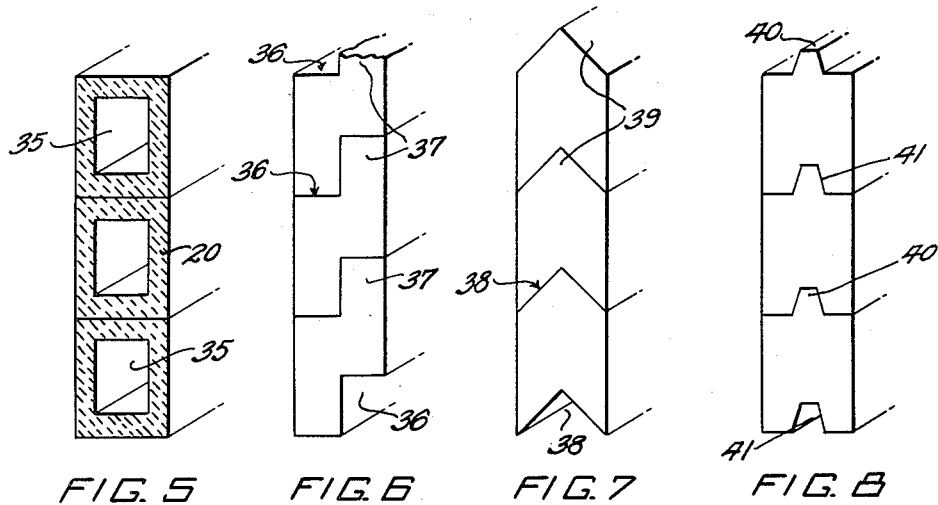
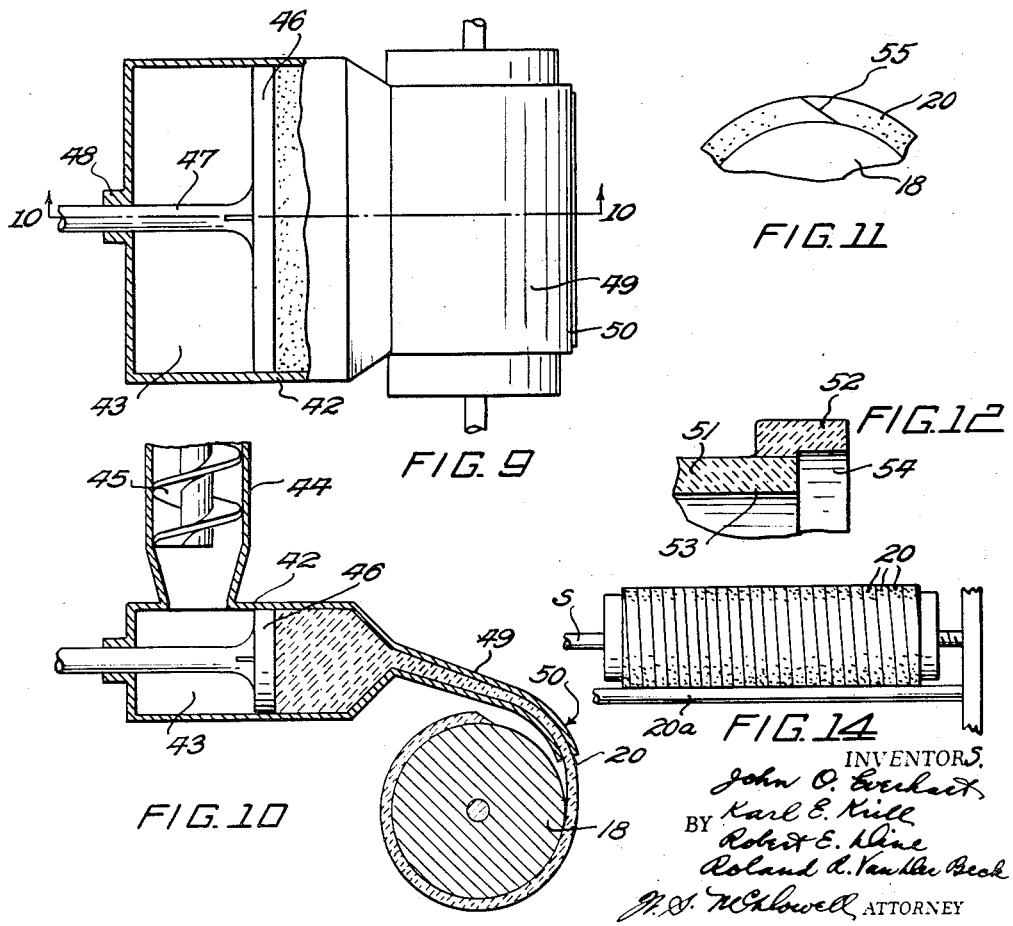

Patented Mar. 16, 1954

2,671,939

UNITED STATES PATENT OFFICE 2,671,939

METHOD AND APPARATUS FOR FORMING TUBULAR CERAMIC BODIES

John O. Everhart, Karl E. Krill, Robert E. Dine, and Roland R. Van Der Beck, Columbus, Ohio, assignors, by mesne assignments, to The National Clay Pipe Research Corporation, Logan, Ohio, a corporation of Ohio Application April 28, 1950, Serial No. 158,894

5 Claims. (Cl. 25—30)

This invention relates to the manufacture of ceramic pipe members and other similar hollow cylindrical bodies. It is concerned primarily with pipe members of the type formed by wrapping extruded webs, sheets or strips of ceramic and cementitious compositions, while the same are in a plastic and formative condition, on or about a rotatable mandrel or core.

Ceramic pipe of, for example, the kind used in forming underground conduits, is produced most commonly by extruding a clay column and thereafter firing the same. Inasmuch as such pipe is required to possess certain varying diameters, the cost of extruding dies and related machinery utilized in its manufacture becomes quite burdensome, a condition which is reflected in the cost of the pipe.

Therefore, in order to reduce the amount of equipment required, and yet to provide means to produce pipe in a variety of different diameters and lengths, including diameters greater than those now produced by conventional extrusion means, the present invention has for its primary object to provide an improved means and method of forming such pipe, in whole or in part, by extruding strips of ceramic material in a plastic formative condition through the use of relatively small and inexpensive extruding machinery, and then wrapping such strips in helical closely adjoining and relatively united convolutions about a rotatable and longitudinally movable roll, mandrel or core. In this manner ceramic pipe of any desired diameter or length may be produced from one or more standard relatively small size clay-extruding machines, since the latter serves only to produce a strip of plastic material having a desired cross-sectional configuration, said strip being then wound about a manderl or similar member possessing a diameter and length which will produce the dimensions desired in the finished pipe.

It is another object of the present invention to provide a novel method and apparatus for producing ceramic pipe by the strip extrusion and mandrel wrapping method in which the plastic and formative strip of material has imparted thereto a preformed curvature before the strip is wrapped about the core or drum, whereby to enable the strip to assume readily the circumferential configuration of the core, drum or mandrel about which it is wrapped with but small likelihood of transverse cleavages or fissures developing therein.

It is another object of the invention of forming ceramic pipe by the wrapping method defined in which the strip material is roughened or scored along its side edges and treated with an adhesive slurry, slip or other bonding material, so that adjoining convolutions thereof may be pressed closely together and sealed or bonded to one another to form an integral and continuous bond between said convolutions throughout the length of the pipe.

It is a further object of the invention to provide a method and means for forming ceramic pipe in which the ceramic material in a plastic state is extruded in the form of a sheet or web of a width which corresponds to the length of the pipe to be formed therefrom, the said web or sheet being wrapped about the core or mandrel and united by a single straight longitudinally extending joint. In attaining this last set forth object, the present invention provides a sheet or web extrusion with a curved outlet by which the sheet or web when extruded possesses a curved or arcuate form readily adapting the same to the curvature of the core or mandrel on which it is applied.

A still further object of the invention is to provide a method and apparatus for producing strong, serviceable ceramic pipe in a more facile and economical manner than heretofore.

Still a further object of the invention resides in providing a method and means for forming ceramic pipe in which use is made of extruded strips of material having cross-sectional configurations by which either butt or scarf joints may be provided between adjoining convolutions of the strips when the same are wound upon a core or mandrel.

Another object of the invention is to provide apparatus for forming pipe, or other similar hollow cylindrical objects, in which strips of plastic material are wrapped in closely joining helical coils about a revolving drum or mandrel, and wherein said drum or mandrel is mounted for rotation about a substantially vertically disposed axis, so that the convolute strips of plastic material are disposed substantially horizontally as they are being wrapped around the drum or mandrel and held in a supported manner, preventing distortion of said coils, which is apt to occur by their own weight when the same are wrapped around a horizontally positioned drum or mandrel.

Still another object of the invention is to provide pipe-forming means of the character under consideration in which the side surfaces of the plastic coils as the latter are being extruded and wrapped around a revolving drum or mandrel are lightly scored or scarified in a manner producing intersecting grooves therein, whereby to enable a bonding slip to be applied to such scarred or grooved surfaces to produce an improved union between the contiguous surfaces of adjoining coils.

Still another object of the invention is to provide a method whereby a hollow extruded strip or column may be helically wound into a pipe with an appreciable reduction in the amount of material required over that employed for forming solid-walled pipe, an advantage of the hollow spirally wound pipe resting in reducing the weight of large-diameter pipe, making feasible the manufacture of pipe in diameters which would be otherwise prohibitively heavy.

With these and other objects and advantages in view, the invention consists in the novel features of construction, combinations of elements, arrangement of parts, including certain novel steps of operation and manner of procedure, all of which are hereinafter more fully set forth and claimed.

In the accompanying drawings:

Fig. 1 is a top plan view, partly in horizontal cross section, of apparatus formed in accordance with the present invention for producing ceramic pipe by the strip-wrapping method;

Fig. 2 is a side elevational view of the apparatus disclosed in Fig. 1;

Fig. 3 is a detail vertical sectional view taken on the line 3—3 of Fig. 2;

Fig. 4 is a horizontal sectional view taken on the plane disclosed by the line 4—4 of Fig. 3;

Fig. 5 is a detail vertical sectional view, partly in perspective, disclosing pipe formed by the present invention from helically wrapped strips of plastic material in which the adjacent edges of the adjoining convolutions of the strips are united by straight butt-type joints;

Figs. 6, 7 and 8 are views similar to Fig. 5 disclosing modified types of joints of the overlapping or scarf type;

Fig. 9 is a top plan view, partly in horizontal section, of a modified form of apparatus utilized by the present invention for the formation of ceramic pipe by extrusion with webs or sheets of ceramic material in a plastic condition and wrapping the same on a drum or mandrel;

Fig. 10 is a vertical sectional view taken on the line 10—10 of Fig. 9;

Fig. 11 is a detail view of a lap joint produced by the apparatus of Figs. 9 and 10;

Fig. 12 is a detail view of a ceramic pipe formed in accordance with the present invention and having one end thereof formed with a bell socket;

Fig. 13 is a fragmentary detail side elevational view disclosing a modified form of presser foot, utilizing a roller;

Fig. 14 is a view of a horizontal mandrel in which the extruded coils are supported against sagging when applied to the mandrel by roll devices.

Referring to the drawings, and more particularly to Figs. 1 to 4 thereof, there has been disclosed at E an extruding machine of the type used in the ceramic industry for extruding pugged clay, brick columns and other products which possess the same cross-sectional configuration throughout the length thereof. In this instance, the machine E has been shown as including a die head 15 and an internal auger 16. There is added to the column-discharging side of the die head a hollow column-forming extension 17 which, as shown in Fig. 1, possesses a curvilineal or arcuate configuration, the shape of the extension being such that a moldable strip or column of clay emerging from the nozzle is, prior to its application to the cylindrical outer surfaces of a form or mandrel 18, of a preformed arcuate shape adapted to the curvature of the cylindrical surfaces of the form or mandrel on which it is applied.

In accordance with the present invention, the form or mandrel 18 is disposed so that its longitudinal axis extends vertically, or at a slight angle to the vertical, the lower portion of the form or mandrel being provided with an annular bottom flange 19 on the upper surface of which the extruded strip or web 20 of ceramic material in a formative state is initially placed and supported, so as to enable the strip or web to be wrapped in closely adjoining convolute coils around the cylindrical outer surface of the form or mandrel. By using the vertically positioned form or mandrel with its bottom flange, it will be noted that improved support is provided for the strip or web 20 over previous disclosures in which the form or mandrel is horizontally positioned. When horizontally positioned, the plastic strip or web tends to elongate and sag, producing an out-of-round condition. By stacking the convolute spirals of the web or strip vertically, as shown herein, such sagging is effectively precluded.

However, if it is desired to employ a horizontal mandrel, the sagging of the extruded plastic column wrapped around such a horizontal mandrel may be prevented by the employment of one or more small-diameter rolls, indicated at 20a. The roll or rolls 20a serve to prevent drooping or sagging on the part of the pipe-forming coils of such a horizontally positioned mandrel. It is, of course, possible to use a roll or rolls 20a in connection with a vertical mandrel, if desired, as indicated at 20b in Fig. 1.

The drum or mandrel 18 may be supported for rotation by a screw shaft S. This shaft may be formed or operated in two ways: For example, the shaft may be provided with a thread, the pitch of which is equal to that of the clay wrapping, the shaft S being non-rotatably mounted. With this construction, the mandrel must be positively driven at a speed to accommodate the clay extrusion speed and later removed when hardened. Second, the threaded shaft S may be rotated, but the mandrel thereon must be positively driven to accommodate the clay extrusion speed, and also the screw shaft must be rotated at a speed dependent upon mandrel speed and screw pitch.

Another feature of the present invention resides in scoring or scarifying the contiguous surfaces of the strip or web to effect an improved union therebetween. Such grooving or scarifying may be accomplished conveniently by providing the outer end of the nozzle extension 17 with a bracket 21 containing a bearing 22 in which is mounted for rotation a motor-driven shaft 23, the latter being provided at one end with a disk 24. Eccentrically pivoted to one face of this disk, as at 25, is a crank 26, the latter in turn being pivotally secured at one end of a longitudinally reciprocable rod 27, the latter being slidably mounted in a bearing 28. The rod may be provided with a plurality of spaced pointed projections 29 which are adapted to contact the under surface 30 of the strip or web 20 as the latter leaves the outlet of the nozzle extension 17, producing the transverse grooves 31 in the surface 30 which substantially perpendicularly intersect longitudinally extending grooves 32 formed in the surfaces 30 by projections formed in the outlet or discharge mouth of the extension 17.

To this grooved or scarified surface, there is applied by means of the pressure pipe, indicated at 33, a slurry or bonding slip, as shown, which enters the grooves 31 and 32 and spreads over the surfaces of the strip therebetween to form an improved bond between the contiguous surfaces of the strip after the latter have been helically wrapped and formed around the mandrel or mold 18. Also, use may be made of a spring pressing foot 34. This foot is carried by the outer end of the nozzle extension 17 and, as shown in Fig. 2 particularly, the resilient outer end of the foot is so disposed as to engage the upper surface of the strip or web 20 as the latter is being coiled around the form or mandrel 18, the foot 34 serving to apply positive pressures in a downward direction to the strip or web to cause the desired union or bond between adjacent surfaces of the strip or web in producing the completed and finished tubular portion. As shown in Fig. 13, the presser foot may be provided at its outer end with a resiliently supported roller 34a which maintains a pressure on the clay column or strip as it is wrapped around the mandrel to force the same into bonded engagement with an adjacent coil.

In this form of the present invention, the strips or webs are substantially rectangular in transverse construction, as shown in Fig. 3, so that their bonded or mating surfaces are flat and form butt joints between contiguous surfaces. In Fig. 5, this butt joint construction has been disclosed although the strip or web is extruded in hollow form, rather than solid, the hollow interior of the strip or web being indicated at 35. Various other types of joints may be used. For example, in Fig. 6, the contiguous edges of the strip or web are shaped to produce interfitting tongues and recesses, as indicated at 36 and 37, forming an overlapping or scarf joint. A somewhat similar arrangement has been suggested in Fig. 7 in which a scarf joint is produced by providing adjoining surfaces of the strip or web to form V-shaped grooves 38 which receive V-shaped extensions 39 having reversely beveled outer surfaces. In Fig. 8, interfitting tongues and grooves 40 and 41 are shown in the formation of a mechanically secure union between the adjacent surfaces of the coils.

Another variation of the present invention is to be found in Figs. 9 through 11 of the drawings. In this form of the invention, the clay-extruding apparatus includes a head 42 having a relatively wide chamber 43 formed therein which communicates with the lower end of a vertical or otherwise positioned barrel 44 in which is mounted a rotatable clay-advancing auger 45. Disposed for reciprocation in the chamber 43 is an elongated piston 46 with which is connected a rod 47, the latter passing through a bearing 48 in one side of the head so that the rod may be connected with a source of power, not shown, such as a hydraulic motor, for imparting controlled movement to the piston to cause the forced expulsion from the chamber 43 of the clay mass contained therein.

As in the previously described form of the invention, the outlet of the head includes a restricted nozzle extension 49 which is preferably of arcuate formation in the region indicated at 50, so that the strip or web 20 of clay will possess an arcuate form when the same is applied to the cylindrical outer surfaces of the form or mandrel 18. The strip or web is of approximately the full length of the finished tubular article to be produced therefrom, avoiding the necessity of the helical wrapping required in the previously described form of the invention. After the strip or web has been wrapped once or more times around the outer periphery of the drum or mandrel 18, the said strip or web may be transversely severed to complete the shape of the final article and separate the same from the material contained in the extruding apparatus.

If the pipe to be formed by the present apparatus is of the bell and spigot type, as indicated at 51 in Fig. 12, an outer band or collar 52 may be formed around one end of the tubular body 53 of the pipe to produce the bell socket 54.

The present invention thus provides an improved method and apparatus for forming cylindrical ceramic pipe sections of varying diameter, wherein an extruded web or strip of clay, or other ceramic material, in a plastic state is either spirally wound about a rotating and longitudinally movable form or mandrel, or wherein the extruded web is so formed as to have a width equal to the length of the pipe section desired. In the latter form of the invention, it will be noted that the web is merely lapped about a form or mandrel and joined at its respective free ends in a lap weld, as indicated at 55. By the term ceramic material, as used herein, it is contemplated that the same shall embrace within its definition such pipe-forming materials as clay, cement, concrete and also cement and mineral fiber mixtures, all of which are now commonly used in the formation of pipe, tile and tubing.

In the form of the invention illustrated in Figs. 1 through 3, it will be observed that the present invention provides for the formation of pipe by winding a substantially continuous extruded strip or web of clay or the like about a vertical or horizontal rotatable mandrel, while compressing the successive convolutions of plastic material endwise of the material and applying an adhesive slip, or other suitable bonding material, to the adjoining surfaces of the clay web in obtaining an integral weld or bond between the successive coils of the applied helix. The web or strip may be extruded in a manner providing overlapping or interlocking mating edge formations, whereby to further facilitate the bonding of successive convolutions to one another.

In the form of the invention shown in Figs. 9 and 10, instead of spirally winding a continuous web of clay about a rotating mandrel, the present invention provides for the extrusion of a relatively wide sheet or web of clay which is wrapped coextensively over the rotating mandrel and lap-welded at its respective ends. Another feature of this invention resides in the use of the curved extrusion nozzle which imparts to the clay web, sheet or strip a radial curvature conforming roughly to that of the outer surface of the mandrel or form upon which it is to be disposed, so that during the wrapping of the plastic material around the mandrel, severe internal stresses and strains are prevented from being set up within the composition of the plastic material to produce cracking or fracture thereof. This feature is highly advantageous in preventing the possibility of breaks in the web of plastic material, as would be apt to occur if the web were to be bent around a drum-like mandrel after being initially extruded in straight form. It will be understood that following the wrapping of the plastic column about the mandrel, the same is caused to set or harden and is thereafter removed from the mandrel and subjected to firing temperatures within a kiln to produce the finished conduit section.

While we have set forth in detail certain preferred embodiments of our present invention which we have found to be desirable in carrying the same into practice, it will be understood that in so doing, we do not limit the invention to the precise structural details, combinations of parts and sequence of operations described and illustrated, since we reserve the right to employ all structural variations or modifications falling fairly within the spirit and scope of the following claims.

We claim:

1. Apparatus for producing tubular bodies of ceramic composition comprisin: a vertically disposed revoluble core having cylindrical outer surfaces and an annular seating flange, apparatus for mixing and extruding ceramic material in the form of a plastic strip, said apparatus having an outlet disposed contiguous to the cylindrical peripheral surfaces of said core, and being operable to extrude a plastic ceramic strip having the same general curvature as the peripheral surface of said core and to discharge the strip for helical winding about said core upwardly from the peripheral flange thereof, means for applying downwardly directed compacting forces to the strip as the same is wound about said core, and means for rotating said core and moving the same at a controlled rate of speed longitudinally with respect to its axis of rotation.

2. The method of making tubular articles from a plastic strip of ceramic composition which comprises the steps of extruding an arcuately curved ceramic strip of plastic composition, forming said curved strip into a tubular article by coiling the same on a rotating mandrel, and roughening the side surfaces of said strip as the same is being extruded and prior to application to said mandrel to form slurry-receiving grooves in said surfaces to produce bonding thereof when applied in adjoining helical coils on said mandrel.

3. The method of making clay pipe, which comprises extruding a longitudinally curved column of clay in a plastic formative condition, wrapping said column in relatively tight adjacently disposed helical convolutions about a forming mandrel, applying laterally directed compressive forces to the column when the same is being wrapped about said mandrel to bring the convolutions into close edgewise engagement, pressing the column against the outer surfaces of the mandrel, whereby to cause the coils to conform closely to said mandrel surfaces and the configuration thereof during the formation of the pipe, and thereafter causing said column of clay to set and harden while on said mandrel.

4. The method of making clay pipe, which comprises extruding a longitudinally curved column of clay in a plastic formative condition, wrapping said column in relatively tight adjacently disposed helical convolutions about a forming mandrel, applying laterally directed compressive forces to the column when the same is being wrapped about said mandrel to bring the resulting convolutions into close pipe-forming relationship, pressing the column against the outer surfaces of the mandrel, whereby to cause the convolutions to conform closely to said mandrel surfaces and the configuration thereof during the formation of the pipe, and applying a bonding slurry to the clay column at the time the latter is wrapped about said mandrel.

5. The method of making clap pipe, which comprises: extruding a longitudinally curved plastic clay column, wrapping said column helically about the exterior surfaces of a cylindrical mandrel, maintaining the coils in close association with each other and with the surface of the mandrel on which the same are wrapped, applying to the surfaces of the column a slip or slurry functioning as a bonding medium in uniting said coils, removing the resultant tubular body from said mandrel, and thereafter firing the same under kiln conditions.

JOHN O. EVERHART.
KARL E. KRILL.
ROBERT E. DINE.
ROLAND R. VAN DER BECK.

References Cited in the file of this patent

UNITED STATES PATENTS

| Number | Name | Date |
| --- | --- | --- |
| 351,615 | Anderson | Oct. 26, 1886 |
| 644,421 | Graham | Feb. 27, 1900 |
| 797,696 | Litchfield et al. | Aug. 22, 1905 |
| 1,246,816 | Hodge et al. | Nov. 13, 1917 |
| 1,736,911 | Gray | Nov. 26, 1929 |
| 1,767,586 | Hudson | June 24, 1930 |
| 1,824,482 | Hartmann | Sept. 22, 1931 |
| 2,037,043 | Postlewaite | Apr. 14, 1936 |
| 2,131,887 | Friederich et al. | Oct. 4, 1938 |
| 2,303,303 | Schleicher | Nov. 24, 1942 |